(12) United States Patent
Goldstein

(10) Patent No.: US 12,286,570 B2
(45) Date of Patent: *Apr. 29, 2025

(54) COMPOSITIONS AND PROCESSES FOR PROVIDING RELEASE COATINGS

(71) Applicant: SYNTHOMER INC., Beachwood, OH (US)

(72) Inventor: Joel E. Goldstein, Cleveland, OH (US)

(73) Assignee: Synthomer Inc., Beachwood, OH (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/411,035

(22) Filed: Aug. 24, 2021

(65) Prior Publication Data

US 2022/0056321 A1 Feb. 24, 2022

Related U.S. Application Data

(60) Provisional application No. 63/069,453, filed on Aug. 24, 2020.

(51) Int. Cl.
*C09J 7/40* (2018.01)
*C09J 11/06* (2006.01)

(52) U.S. Cl.
CPC ............... *C09J 7/401* (2018.01); *C09J 11/06* (2013.01); *C09J 2431/005* (2013.01); *C09J 2433/005* (2013.01)

(58) Field of Classification Search
CPC . C09J 7/401; C09J 2433/005; C09J 2431/005
See application file for complete search history.

(56) References Cited

U.S. PATENT DOCUMENTS

| | | | | |
|---|---|---|---|---|
| 2,532,011 A | * | 11/1950 | Hendricks | C09J 7/21 525/61 |
| 5,225,480 A | * | 7/1993 | Tseng | C08F 220/343 524/812 |
| 5,990,238 A | * | 11/1999 | DiZio | C08G 18/6212 525/61 |
| 10,889,736 B2 | * | 1/2021 | Goldstein | C09J 7/401 |
| 2002/0022118 A1 | * | 2/2002 | Sarkar | B41M 5/504 428/32.22 |
| 2004/0126576 A1 | * | 7/2004 | Kinning | C09J 7/21 428/354 |
| 2005/0014886 A1 | * | 1/2005 | Yanutola | C09J 7/405 524/503 |
| 2016/0362237 A1 | * | 12/2016 | Mussell | B65D 65/42 |

* cited by examiner

*Primary Examiner* — Brieann R Johnston
(74) *Attorney, Agent, or Firm* — Buchanan Ingersoll & Rooney PC

(57) ABSTRACT

An aqueous composition that can be used to provide a release release properties to adhesive tape substrates can be applied at coating weights far less than those required in previously available compositions containing the same or similar release polymers. Inclusion of small amounts of a superwetter results in improved coatability and reduced amounts of sound generated during the process of releasing an adhesive tape from its roll.

6 Claims, No Drawings

COMPOSITIONS AND PROCESSES FOR PROVIDING RELEASE COATINGS

CROSS-REFERENCE TO RELATED APPLICATIONS

This application claims the benefit of U.S. provisional application No. 63/069,453, filed 24 Aug. 2020, the entire disclosure of which is incorporated herein by reference.

BACKGROUND INFORMATION

Adhesive tapes, which are typically provided in roll form, are highly engineered articles that include as primary elements a substrate and, provided on opposite primary surfaces of the substrate, an adhesive and a low adhesion backsize (LAB). The latter improves handling characteristics, providing reversible adhesion or an ability to unwind a roll product despite the fact that the adhesive layer borne on one layer of substrate is adjacent to another layer of the substrate. For more information on the composition and common physical forms of LABs, the interested reader is directed to Chapter 26 in D. Satas, "Release Coatings," Handbook of Pressure Sensitive Adhesive Technology, 3d ed. (1999).

The primary types of substrates employed in making adhesive tapes are fiber-based (e.g., paper) and polymeric films. Each presents its own set of challenges with respect to the provision of good LABs.

In the case of polymeric film backings, the provision of LABs has involved so-called release agents. Examples of release agents include nonionic surfactants, long chain alkyl carboxylic acids and esters, (meth) acrylates with long chain side groups, polyurethanes, silicone polymers (particularly polydialkylsiloxane homo- and copolymers), and fluorinated polymers and waxes; for more information on release agents, the interested reader is directed to any of a variety of texts and overviews such as, e.g., Chapter 12 in Kenning and Schneider, "Release Coatings for Pressure Sensitive Adhesives," Adhesion Science and Engineering-Surfaces, Chemistry, and Applications, pp. 535-71 (2002). Coating techniques have included (1) application of a liquid composition (e.g., emulsion, suspension or dispersion) that includes a film forming polymer and one or more release agents followed by drying, which results in a release film of release agent(s) entrained in a polymeric network, and (2) extrusion of LAB compositions that include one or more release agents blended with an extrudable polymer, such as a polyolefin.

Silicone-based compounds (i.e., polysiloxanes), alone or blended with a hydrocarbon polymer, can be very effective release agents. However, small amounts of the silicone compound often transfer to the adhesive, which can give rise to "craters" or "fisheyes."

Certain types of adhesive articles are provided release properties using non-silicone polymers such as vinyl acetates, acrylates or carbamates, e.g., PVODC or the types described in U.S. Pat. No. 10,889,736.

When silicone-free release polymers are coated so as to provide a release coating for an adhesive tape, a solids content of ~3% (w/w) polymer can be used when an organic liquid is used as the carrying liquid. Organic liquids provide coatings that are homogeneous and continuous on polymeric films.

However, when the carrying liquid is changed to water for coatings based on these same silicone-free release polymers, which provides a regulatory advantage because of a reduction in VOCs, solids contents on the order of 20% (w/w) polymer are required to ensure coverage of the film substrate. This both increases the weight of the resulting tape and puts water-based release coating compositions at a significant cost disadvantage relative to their higher VOC organic liquid counterparts.

That which remains desirable is an aqueous release coating composition for polymeric film adhesive tape substrates which can be applied at coating weights closer to the 3% (w/w) number achievable with organic liquid release coating compositions and which provides a release coating free of silicone release polymers.

SUMMARY

Provided herein are aqueous compositions useful for providing release properties to adhesive tape substrates. These compositions can be provided in VOC-free form and can provide a surface or coating which exhibits excellent release even after aging under high humidity. Advantageously, these compositions can be applied at coating weights far less than those required in previously available compositions containing the same release polymers.

In addition to water and one or more types of non-silicone release polymers, these compositions include a low level of superwetter, for example, from more than zero to 2% (w/w, relative to the overall composition). This type of composition can provide a homogeneous coating of release composition even in situations where the solids of the composition is far below that which previously was required in practice.

Adhesive tape substrates can be coated with compositions which include no more than 14%, no more than 12%, no more than 10% and even no more than 8% solids (all w/w). This constitutes a 30-60% reduction in solids content relative to previously available compositions containing the same release polymers.

Release polymers in the coating compositions exhibit good adhesion to the most commonly employed types of substrates for articles such as label liners and wound tapes, both at the time of application and even after being aged under high humidity and/or at low or high temp-eratures. Further, they provide good release from a wide variety of adhesives including, but not limited to, natural rubber, acrylics and hot melts.

Accordingly, in another aspect, articles that include a surface bearing an adhesive layer and, in contact with the adhesive layer, a surface bearing a release layer provided from such a composition also are provided. The adhesive layer and release layer can be on opposite sides of the same substratein a tape article. In a label article, the adhesive layer can be applied to one substrate while the release layer is applied to another substrate, with the two substrates being arranged such that the adhesive layer and release layer are in direct contact.

Also provided are methods of making such articles.

Other aspects of the invention will be apparent to the ordinarily skilled artisan from the detailed description that follows. To assist in understanding that description, certain defini-tions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"mer" or "mer unit" means that portion of a polymer derived from a single reactant molecule (e.g., ethylene mer has the general formula —CH$_2$CH$_2$—);

"substituted" means one containing a heteroatom or functionality (e.g., hydrocarbyl group) that does not interfere with the intended purpose of the group in question;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"release agent" means a compound or mixture of compounds that is designed or intended to permit an adhesive to smoothly and controllably release from a surface to which the compound(s) is/are applied without transferring to that adhesive during the release process;

"release polymer" means a polymeric release agent;

"low adhesion backsize" or "LAB" means a composition that includes at least a coating polymer and a release agent, often in combination with ingredients that include one or more surfactants;

"VOC-free" means exhibiting, when subjected to standard analytical testing procedures, generally less than 0.5 ppm, commonly less than 0.25 ppm, typically less than 0.1 ppm, and preferably less than 0.05 ppm of volatile organic chemicals;

the formative "(thio)" indicates an intent to include the S-containing analog of the compound or group used in connection with the formative;

"iso (thio) cyanate" means a group of the general formula —N=C=O or —N=C=S or a compound that includes such a group;

"(meth) acrylate" means methacrylate or acrylate;

"active hydrogen" is an H atom that results in the production of methane when the compound in which the H atom is contained is subjected to Zerewitinoff determination testing;

"lower alkyl" means an alkyl group that contains no more than 6 C atoms;

"long chain alkyl" means an alkyl group that contains at least 12 C atoms;

"superwetter" means that type of surface active agent (surfactant) which, when a drop thereof is placed on a paraffin surface at room temperature, spontaneously spreads; and "radical" means that portion of a molecule which remains after reacting with another molecule, regardless of whether any atoms are gained or lost as a result of the reaction.

DETAILED DESCRIPTION

As suggested in the preceding Summary section, the composition can contain as few as three ingredients: water, a non-silicone release polymer, and up to 2% (w/w) superwetter.

Release polymers that can be used in the composition include those polymers which contain at least 50%, preferably at least 60%, more preferably at least 70%, still more preferably at least 80%, even still more preferably at least 90%, and most preferably at least 99% vinyl acetate or acrylate mer. (Each of the foregoing is a molar percentage.)

Because they can provide very low VOC compositions, including VOC-free compositions, which do not generate formaldehyde when processed (e.g., dried) under typical manufacturing conditions, those polymers described in U.S. Pat. No. 10,889,736 are one preferred group of release polymers that include acrylate mer. An abridged description of those polymers is provided here for ease of reference.

Polymers in this preferred group contain mer units having pendent groups that include at least two (thio) carbonyl groups and multiple additional heteroatoms.

In certain embodiments, the C atom of one of the (thio) carbonyl moieties of the pendent groups is bonded to two additional heteroatoms, one of which is N and the other is selected from O, S and N.

In some of these embodiments, the pendent groups can be represented by the general formula

where X represents O or S, E represents an O or S atom or a NR' group where R' is H or a $C_1$-$C_6$ alkyl group, $R^2$ represents a lower alkyl, aryl, alkaryl or aralkyl group (optionally containing a heteroatom such as O, with the proviso that no active hydrogen atoms are present), Z represents a divalent (thio) carbonyl-containing group that further includes two additional heteroatoms bonded to the C atom of the (thio) carbonyl moiety, and $R^3$ represents a long chain alkyl group or a larger functionality that includes a long chain alkyl group. Examples of additional heteroatoms that can be bonded to the C atom of the carbonyl moiety in Z include O, S and N; at least one of the additional heteroatoms typically is N. (The predominant form of Z depends on the particular identities of E and X and, to some extent, the conditions under which the reaction is conducted.)

Preferred polymers which contain a general formula (I) type of pendent group can be provided from monomers represented by the following general formulae, with each of $R^2$, $R^3$, E and X being defined as above, and $R^1$ is H or a methyl group:

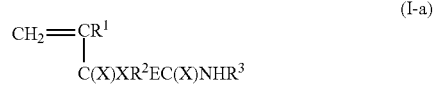

In other embodiments, the pendent groups can be represented by the general formula

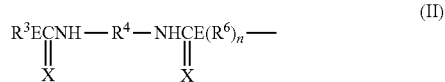

where $R^3$, X, and E are defined as above, n is 0 or 1, $R^4$ is the radical of a hydrocarbon compound having two iso (thio) cyanate groups of differing reactivities, and $R^6$ is a linking group such as a carbonyl, ether, amine, etc., group. General formula (II) pendent groups are similar to those defined by general formula (I) with the exception that Z and $R^3$ (from general formula (I)) are not directly bonded but, instead, separated by an additional linking group.

Polymers which contain a general formula (II) type of pendent group can be provided from monomers represented by the following general formula, with each of $R^3$, $R^4$, E and X being defined as above and $R^5$ being a polymerizable group, optionally but typically bonded to the adjacent E atom through a linear or cyclic linking group, e.g., a-$R^2$XC(X)-group:

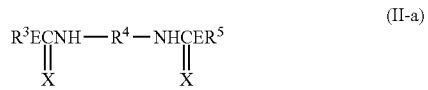
(II-a)

Related to polymers defined by general formula (II-a) are those resulting from a two-step reaction scheme. A diiso(thio)cyanate having iso (thio) cyanate groups with differing reactivities, e.g., isophorone diisocyanate (IPDI), 2,4-toluene diisocyanate (2,4-TDI), and the like, as well as sulfur analogs of each, is reacted with two EH group-containing compounds (with the proviso that, if E=NR', then R' preferably is not H so as to prevent interfering reactions). One of the EH groups includes a polymerizable functionality and the other includes a long chain alkyl group (or a larger functionality that includes a long chain alkyl group) such as specifically a $C_{15}$-$C_{25}$, preferably $C_{16}$-$C_{20}$, more preferably $C_{17}$-$C_{18}$, substituted or unsubstituted alkyl group.

Non-limiting examples of the first type of EH group-containing compound include those represented by the following general formulae

(III-a)

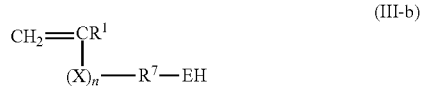
(III-b)

where $R^1$, $R^2$, n, E and X are defined as above, and $R^7$ is a phenyl or $C_1$-$C_6$ alkyl group. (In certain embodiments, $R^2$ preferably is a $C_1$-$C_6$ alkyl group.)

One subset of general formula (III-b) compounds where n is 0 is the substituted styrenes, including those where $R^7$ is a phenyl group, defined by the general formula

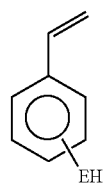
(III-b-1)

where E is defined as above. Variants of this formula also are possible; for example, α-methyl styrene analogs of general formula (III-b-1) compounds are expected to be useful, as are compounds in which the EH group is indirectly bonded to the styrene ring, e.g., through a hydrocarbyl linking group.

Another subset of general formula (III-b)-type compounds where n is 0 is the vinyl alcohols/ethers, i.e., general formula (III-b) compounds with $R^7$ being a lower alkyl group, preferably a $C_1$-$C_3$ alkylene group, more preferably a $C_1$-$C_2$ alkylene group. Also contemplated are sulfur and amine analogs of these compounds, i.e., embodiments where E=S or NR'.

One subset of general formula (III-b)-type compounds where n is 1 is the diol vinyl ethers, i.e., general formula (III-b) compounds with X being an O atom and $R^7$ being a lower alkylene group, preferably a $C_1$-$C_4$ alkylene group. Also contemplated are sulfur and amine analogs of these compounds, i.e., embodiments where E=S or NR', as well as those analogs where X=S.

Non-limiting examples of the second type of EH group-containing compound include those defined by $R^3$-EH where $R^3$ and E are defined as above.

Other preferred polymers contain mer units having a pendent group represented by the general formula

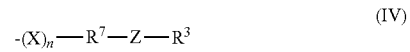
(IV)

where X, n, Z, $R^3$ and $R^7$ are defined as above.

Polymers which contain a general formula (IV)-type pendent group can be provided from monomers represented by the following general formula, with all variables being defined as above:

(IV-a)

with the predominant form of Z depending on the particular identities of E and X and, to some extent, the conditions under which the reaction is conducted. Polymers resulting from polymerization of general formula (IV)-type compounds have hydrocarbon backbones with multiple pendent groups defined by general formulae (IV).

As a specific non-limiting example, the compound of general formula (III-b-1) can be reacted with a $R^3$-NCX compound (with $R^3$ and X being defined as above) to provide a monomer represented by the general formula

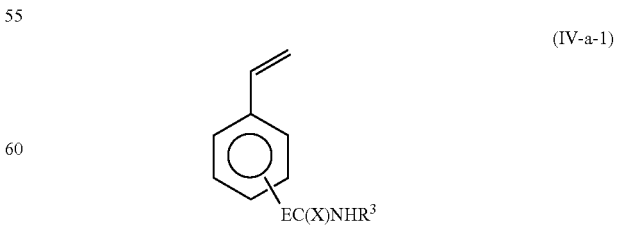
(IV-a-1)

with E, X and $R^3$ being defined as above. The reaction products of a $R^3$-NCX compound with a variety of other general formula (III-b) compounds also are possible.

In certain embodiments, each X in each of the foregoing general formulae can be an oxygen atom.

Preparation of each of these types of polymers is described in the previously referenced U.S. Pat. No. 10,889,736. The polymerizations can be homopolymerizations, can involve two or more such compounds, or can involve one or more comonomers which can partic-ipate in emulsion polymerizations and that can be radically initiated, e.g., polyenes, particularly conjugated dienes, and vinyl compounds, particularly (meth) acrylates and derivatives thereof. Comonomers which include a long chain alkyl pendent group and/or that increase or do not substantially decrease the glass transition temperature (Tg) and/or melt temperature (Tm) of the resulting interpolymer are preferred.

The numerical (mole) percentage of mer derived from one or more of the afore-described carbamate moiety-containing pendent groups is at least 33%, generally at least 50%, 55%, 60% or 65%, commonly at least 67% or 70%, and typically at least 75% or more. The numerical (mole) percentage of mer derived from inventive release polymers often is at least 80%, 85%, 90% or even 95%.

The VOC contents of such polymers generally is less than 5 ppm, commonly less than 3 ppm, more commonly less than 2 ppm, and typically less than 1 ppm. In many embodiments, the polymers are VOC-free.

Regardless of the particular monomers used to make the release polymer, the result of an emulsion polymerization typically is an aqueous dispersion of polymers having weight average molecular weights (Mw) on the order of 125+75 kg/mol, commonly 125+50 kg/mol, and typically 125+25 kg/mol.

Emulsion polymerizations of release polymers generally can have a solids content of from ~15 to ~75% (w/w), preferably from ~20 to ~70% (w/w), with preference is given to a solids content of from ~ 25 to 65% (w/w). Maximizing solids content usually is desirable, a characteristic that can be facilitated by a polymodal particle size distribution. A second or subsequent particle size can be generated by introduction of a seed polymer, by adding excess emulsifier, or by adding mini-emulsions.

The release polymer can be used in the form of its aqueous dispersion or can be recovered and further processed. Surfactants, initiators, chain transfer agents, and the like need not be removed prior to such further processing.

As noted above, compositions of the present invention include ≤14%, ≤12%, ≤10% and even ≤8% solids (all w/w), so the product of a typical emulsion polymerization can be diluted with water to reach the desired solids content.

In addition to water and one or more non-silicone release polymers, the present compositions include from more than zero to 2% (w/w) of one or more superwetters (also known as "super-spreaders"). In certain embodiments, the amount of superwetter(s) can be at least 0.25% (w/w). Preferred amounts include 0.5 to 1.5% and particularly 0.75 to 1.25% (both w/w, based on the weight of the overall composition).

Inclusion of the foregoing amounts of superwetter(s) in the composition has been found to improve the appearance and ease of release of a coating provided therefrom. For example, a composition having 10% (w/w) solids content but no superwetter will exhibit significant de-wetting during application whereas an identical composition which includes a small amount (e.g., 0.5% (w/w)) superwetter will exhibit little-to-no de-wetting. Additionally and surprisingly, the sound emitted during the process of releasing adhesive tape from its roll can be significantly reduced from zippy (which, in an industrial setting, can result in the need for worker ear protection) to a far lesser volume.

Without wishing to be bound by theory, inclusion of superwetter in the aqueous composition is believed to reduce the number and/or size of substrate portions that are not covered with release coating (upon water evaporation of the coating and coalescence). Bare substrate are believed to create a slip-stick phenomenon, which create noise upon release, i.e., during unwinding of the PSA roll.

Even at low concentration, superwetters greatly reduce the surface tension of aqueous compositions, facilitating the dispersion thereof across hydrophobic surfaces and, in some instances, to decrease the amount of time necessary to achieve such dispersion and/or to render a surface superhydrophilic. This ability is believed to be based on their ability to pack very efficiently at surfaces.

Non-limiting examples of compounds which can qualify as superwetters include silicone polyether copolymers (of varying molecular weights and architectures), gemini silicone surfactants, acetylenic diols, certain fluorosurfactants, organosilicones, trisiloxane-based surfactants, carbosilane, fluoroorganic surfactants, alkoxylated acetylenic glycols, hydroxythioethers, etc.; see also U.S. Pat. Nos. 10,552,557, 10,485,739, 10,456,766, 10,415,000, 9,834,699, 8,648,211, 7,264,885, 7,160,373, 6,926,766, 6,645,392, 6,566,322, 6,495,058, 6,475,953 and 6,407,042.

Superwetters are commercially available under brand names such as Silwet™ (Momentive; Waterford, New York), Dowsil™ (Dow; Midland, Michigan), Surfynol™ and Dynol™ (Evonik; Essen, Germany), and the like.

The specific coatability and sound-upon-release improvements have been observed with a sulfosuccinate (e.g., dioctyl sulfosuccinate), lauryl amine oxide, polysorbates, and a mixture of 1-undecanol, sodium lauryl sulfate, 1-octyl-2-pyrrolidone, and ethoxylated undecanol.

Advantageously, inventive aqueous compositions useful for providing release properties to adhesive tape substrates can be processed and employed similarly to other other compositions based on aqueous deliverable release polymers. A variety of substrates, including various papers, foils and polymeric films can be coated, using standard commercial conditions, coating thicknesses, coating speeds, etc.

Release coatings provided from the present compositions can be used in connection with a variety of adhesives, typically pressure sensitive adhesives (PSAs), that include one more polymers such as natural rubber, butyl rubber, vinyl ethers, any of a variety of acrylates, polymers including polyene mer, particularly polydienes such as 1,3-butadiene, isoprene and the like, block copolymers (e.g., SBS, SIS, etc.), random copolymers (e.g., SBR), silicone rubber, and the like. The foregoing are to be considered exemplary and not limiting, with the release polymers of the present invention having been seen to work well with many types of adhesives.

While various embodiments of the present invention have been provided, they are presented by way of example and not limitation. To the extent feasible, as long as they are not interfering or incompatible, features and embodiments described above in isolation can be com-bined with other features and embodiments.

The relevant portions of any document specifically referenced in the preceding text or in the examples that follow are incorporated herein by reference.

The following non-limiting, illustrative examples provide the reader with detailed conditions and materials that can be useful in the practice of the present invention.

EXAMPLES

Unless a specific source is indicated, all chemicals used in the following examples are available from general chemical suppliers such as, for example, Sigma-Aldrich Co. (St. Louis, Missouri).

A series of aqueous coating compositions, each at 10% (w/w) solids, were prepared from Suncryl™ HP 114 acrylate polymer emulsion (OMNOVA Solutions Inc.; Beachwood, Ohio). Varying amounts (0.1 to 1.0 weight percent) of dioctyl sulfosuccinate (DOSS) superwetter were added to these.

Aliquots of these compositions were applied to PET films having thicknesses of 0.051 mm (2 mils) using a #0 rod, followed by drying for ~120 seconds at ~116° C. (240° F.).

These coated films then were laminated to the adhesive side of a film tape, tesa™ 7475 acrylic adhesive tape (tesa tape inc.; Charlotte, North Carolina).

The coated test films (tape laminates) were aged (heat conditioned) for ~16 hours at a constant temperature of 65° C. and 60% relative humidity.

Strips of self-wound tape articles cut to ~2.54 cm (1 in.) wide and ~12 cm (5 in.) long were laminated without heat using a 2.54 cm wide double-coated adhesive paper tape applied to the release side of the test strip. The attached test strip was rolled twice on the working platen with a 2 kg rubber roller moving at a rate of ~0.005 m/see (1 ft./min.).

Each test film was evaluated using the Pressure Sensitive Tape Council's Peel Adhesion of Pressure Sensitive Tape methodologies (PSTC-101, rev. 05-2007, test methods A (180° peel) and F (90° peel)). The resulting release test values are a quantitative measure of the force required to remove a flexible adhesive tape from a coating of a given release material at a specific angle and rate of removal.

In the test designated 101-A below, the strip of adhesive tape was pulled from the release coated material at an angle of 180° and a rate of 0.005 m/see (1 ft./min.). The force required to remove the adhesive from the release coating was measured over a 5 second data collection time.

In the test designated 101-F below, the strip of adhesive tape was pulled from the release coated material at an angle of 90° and a rate of 0.255 m/see (50 ft./min.). The force required to remove the adhesive from the release coating was measured over a 5 second data collection time.

In the test designated 101-E below, so-called subsequent adhesion was evaluated using PSTC-101, method E.

The results of the tests are set forth in Table 1, where the letters represent the following samples (parenthetical number representing weight percentage of DOSS included):

A (1%)—very good, clear coating with slight edge crawl
B (0.75%)—good, clear coating with slightly more edge crawl than A
C (0.5%)—clear coating with more edge crawl than B and some warbling ("orange peel") near the edges
D (0.25%)—significant edge crawl and many small dewetting spots throughout the draw down
E (0.1%)—edge crawl similar to D but with even more areas of dewetting The column labeled "Sound" is a subjective determination, with the abbreviations representing
Z (zippy)—ripping sound
SZ (slightly zippy)—controlled tearing sound
VSZ (very slightly zippy)—some tearing sound audible
SS (slight sound)—no tearing sound, but audible at a distance
VSS (very slight sound)—audible nearby

TABLE 1

Suncryl™ HP 114 release properties at varying amounts of DOSS

| | 101-A (oz./in.) (N/mm) | | 101-F (oz./in.) (N/mm) | | 101-E (%) | Sound |
|---|---|---|---|---|---|---|
| A | 19.9 | 141 | 3.1 | 22 | 78.3 | VSZ-VSS |
| B | 20.2 | 143 | 3.4 | 24 | 85.2 | VSZ-VSS |
| C | 16.0 | 113 | 4.0 | 28 | 79.7 | VSZ-VSS |
| D | 35.8 | 253 | 5.9 | 42 | 83.0 | SZ-SS |
| E | 38.8 | 274 | 8.9 | 63 | 79.2 | SZ-SS |

The foregoing tests were repeated with a different release coating, Suncryl™ CL 223B (OMNOVA Solutions), and at a different total solids content (20% rather than 10%).

The results of these tests are set forth in Table 2, where the letters represent the following samples:

F—0% superwetter
G—0.25% superwetter
H—0.5% superwetter
I—0.75% superwetter

TABLE 2

Suncryl™ CL 223B release properties at varying amounts of DOSS

| | 101-A (oz./in.) (N/mm) | | 101-F (oz./in.) (N/mm) | |
|---|---|---|---|---|
| F | 56.0 | 395 | 51.7 | 365 |
| G | 45.9 | 324 | 35.9 | 254 |
| H | 47.7 | 337 | 34.1 | 241 |
| I | 42.5 | 300 | 31.2 | 220 |

From the foregoing, one can see that inclusion of even small amounts of a superwetter in an aqueous coating composition can provide release coatings with improved release and reduced amounts of sound emitted during the process of releasing adhesive tape from its roll.

The use of DOSS as the superwetter in both of the foregoing sets of tests permits head-to-head comparison of the two types of release coating compositions. However, this is not to be considered limiting. Other types of superwetters at similar loading levels are expected to exhibit similar trends.

That which is claimed is:

1. An aqueous composition for release coatings, the aqueous composition having a total solids content of no more than 10 weight percent and comprising:
    a) a release polymer component that is free of silicone release polymers and that comprises a release polymer from a monomer of formula (I-a) and which has a weight average molecular weight of 125+75 kg/mol,

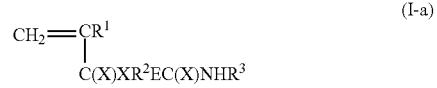

where $R^1$ is H, X is O, $R^2$ is lower alkyl, E is O and $R^3$ is a long chain alkyl group, where the release polymer includes pendent groups of formula (I)

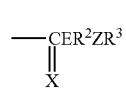 (I)

where X is O or S, E is O or S or NH, $R^2$ is a lower alkyl, Z is a divalent (thio) carbonyl-containing group that further includes two additional heteroatoms bonded to the carbon atom of the (thio) carbonyl, and $R^3$ is a long chain alkyl group; and b) from 0.75 to 1.25 weight percent, relative to the composition, of dioctyl sulfosuccinate.

2. The aqueous composition of claim 1 having total solids content of no more than 8 weight percent.

3. The aqueous composition of claim 1 wherein each release polymer has a weight average molecular weight of 125+25 kg/mol.

4. A process for providing a release coating to an article, the method comprising applying to a substrate the aqueous composition of claim 1.

5. An article comprising a substrate coated with the aqueous composition of claim 1.

6. The article of claim 5, further comprising an adhesive layer.

\* \* \* \* \*

UNITED STATES PATENT AND TRADEMARK OFFICE
CERTIFICATE OF CORRECTION

PATENT NO. : 12,286,570 B2  
APPLICATION NO. : 17/411035  
DATED : April 29, 2025  
INVENTOR(S) : Joel E. Goldstein Page 1 of 1

It is certified that error appears in the above-identified patent and that said Letters Patent is hereby corrected as shown below:

In the Claims

Column 10 at Line 57, Claim 1: delete "125+75" and insert -- 125±75 --

Column 11 at Line 18, Claim 3: delete "125+25" and insert -- 125±25 --

Signed and Sealed this  
First Day of July, 2025

Coke Morgan Stewart  
*Acting Director of the United States Patent and Trademark Office*